United States Patent
Karikari et al.

(10) Patent No.: US 9,790,394 B2
(45) Date of Patent: Oct. 17, 2017

(54) FLOOR COATING COMPOSITIONS CONTAINING SUPRAMOLECULAR POLYMERS

(71) Applicant: Rohm and Haas Company, Philadelphia, PA (US)

(72) Inventors: Afua Sarpong Karikari, Bristol, PA (US); Theodore Tysak, Ambler, PA (US)

(73) Assignee: ROHM AND HAAS COMPANY, Philadelphia, PA (US)

( * ) Notice: Subject to any disclaimer, the term of this patent is extended or adjusted under 35 U.S.C. 154(b) by 2 days.

(21) Appl. No.: 15/025,114

(22) PCT Filed: Sep. 16, 2014

(86) PCT No.: PCT/US2014/055764
§ 371 (c)(1),
(2) Date: Mar. 25, 2016

(87) PCT Pub. No.: WO2015/047781
PCT Pub. Date: Apr. 2, 2015

(65) Prior Publication Data
US 2016/0230035 A1     Aug. 11, 2016

Related U.S. Application Data

(60) Provisional application No. 61/883,276, filed on Sep. 27, 2013.

(51) Int. Cl.
| C09D 133/08 | (2006.01) |
| C08G 83/00 | (2006.01) |
| C09D 1/04 | (2006.01) |
| C08F 220/18 | (2006.01) |
| C09D 133/14 | (2006.01) |
| C08K 5/3462 | (2006.01) |

(52) U.S. Cl.
CPC .......... *C09D 133/08* (2013.01); *C08F 220/18* (2013.01); *C08G 83/008* (2013.01); *C09D 1/04* (2013.01); *C09D 133/14* (2013.01); *C08K 5/3462* (2013.01)

(58) Field of Classification Search
None
See application file for complete search history.

(56) References Cited

U.S. PATENT DOCUMENTS

| 3,965,519 A | 6/1976 | Hermann |
| 4,032,496 A | 6/1977 | Spencer et al. |
| 7,034,080 B1 | 4/2006 | Ohrbom et al. |
| 2004/0034190 A1* | 2/2004 | Janssen ................ C07D 239/47 528/423 |
| 2012/0220701 A1 | 8/2012 | Gonzalez Leon et al. |

FOREIGN PATENT DOCUMENTS

| WO | 2013130357 A1 | 9/2013 | |
| WO | WO 2013130357 A1 * | 9/2013 | ............... C09G 1/04 |

* cited by examiner

*Primary Examiner* — Vu A Nguyen
(74) *Attorney, Agent, or Firm* — Kenneth Crimaldi

(57) ABSTRACT

The present invention provides an aqueous floor coating composition comprising: (A) water; (B) at least one supramolecular polymer; and (C) optionally, one or more additional ingredients. The supramolecular polymer (B) comprises polymerized units derived from: (1) one or more 4H monomers which comprise a polymerizable group and a quadruple hydrogen bonding (4H) moiety; (2) at least one monomer having acid functional groups; and (3) one or more ethylenically unsaturated monomers. In a preferred embodiment, the supramolecular polymer comprises 4H monomers derived from reaction of an isopropenyl alpha, alpha-dimethylbenzyl isocyanate (TMI) and 2-amino-4-hydroxy-6-methylpyrimidine (MIC), as well as acid functional monomers selected from (meth)acrylic acid, and ethylenically unsaturated monomers comprising butyl acrylate, methyl methacrylate, and styrene.

2 Claims, No Drawings

FLOOR COATING COMPOSITIONS CONTAINING SUPRAMOLECULAR POLYMERS

FIELD OF THE INVENTION

The present invention relates to an aqueous floor coating composition containing supramolecular polymers having quadruple hydrogen bond forming moieties. Such compositions used in floor polish formulations provide coatings with high durability and removability, without multivalent metals such as zinc.

BACKGROUND OF THE INVENTION

Floor coating compositions having high durability and removability have historically been obtained by including multivalent metals, such as zinc, which provide crosslinking among the polymer components of floor coating compositions. More recently, however, heightened environmental concern over the use of zinc and other metals in various end-use products, including floor coatings, has shifted the focus to using "greener" technologies. Since the United States Environmental Protection Agency has listed zinc among the 65 Toxic Pollutants and 126 Priority Pollutant list of the Clean Water Act, limits on the amount of zinc that can be discharged down public sewers has been imposed and enforced in the United States. Consequently, there is now a strong demand for zinc-free floor coatings which still have the performance of zinc-containing polishes, and this has driven a need for development of alternative crosslinking technologies that provide the performance that zinc previously provided in such products.

Metal-free polymers first emerged in the 1980's as an alternative technology for the floor care industry. However, floor coatings containing such metal-free polymers were generally less glossy, less durable and more expensive when compared to the conventional zinc-containing floor polishes. Notwithstanding technological advances in recent years, which are bringing the performance and prices of metal-free polymers to near competitive levels, polymers which deliver equal or superior performance continue to be sought in the floor care industry. Conventional floor coatings continue to contain some zinc and rely on zinc crosslinking to provide the level of high durability and removability demanded by end-users.

Supramolecular polymers, which utilize well-defined hydrogen bonding interactions, have received increased attention as alternatives to typical crosslinking agents such as polyvalent metals. Supramolecular polymers having quadruple hydrogen bond forming moieties provide multiple hydrogen bonding sites in a single functional unit and, as a consequence, provide enhanced stability compared to single hydrogen bonding. Such multiple hydrogen bonds are moderately strong and highly directional, as well as having other desirable properties such as thermoreversibility and responsiveness to external stimuli including pH, solvent polarity, temperature, and concentration. All of these characteristics make supramolecular polymers having quadruple hydrogen bond forming moieties excellent for use in floor coatings in place of, or in addition to, multivalent metals such as zinc to provide floor polishes having excellent durability and removability.

U.S. Pat. Nos. 6,320,018 B1 and 6,803,447 B2 both describe supramolecular polymers containing complementary and self-complementary quadruple hydrogen bonding groups, as well as their synthesis from monomers containing a quadruple hydrogen bonding group and one or more polymerizable monomers. It is mentioned that the quadruple hydrogen bonds of such polymers are much stronger than those in other supramolecular polymers which form only triple hydrogen bonds. There is already a great deal of literature and documentation concerning the synthesis of supramolecular polymers having either 3 or 4 hydrogen bond forming moieties and their relative properties.

U.S. Pat. No. 7,838,621 describes supramolecular polymers and their synthesis where the supramolecular polymers contain multiple quadruple hydrogen bonding moieties as integral parts of the polymeric main chain. Excluded are polymers where the quadruple hydrogen bonding moieties are covalently bonded to one or more silicon-carbon bonds of the polymeric chain.

An object of the present invention is to provide metal-free aqueous coating compositions which are useful in formulating floor coatings having improved durability and removability. This is accomplished by including supramolecular polymers having quadruple hydrogen bonding groups in the aqueous coating compositions, rather than multivalent metals as in the past.

SUMMARY OF THE INVENTION

The present invention provides an aqueous floor coating composition comprising: (A) water; (B) at least one supramolecular polymer; and (C) optionally, one or more additional ingredients. The supramolecular polymer (B) comprises polymerized units derived from: (1) one or more 4H monomers which comprise a polymerizable group and a quadruple hydrogen bonding (4H) moiety; (2) at least one monomer having acid functional groups; and (3) one or more ethylenically unsaturated monomers. The optional additional ingredients are selected from: an alkali soluble resin, a leveling agent, a wax emulsion, a defoaming agent, a preservative, a solvent, a surfactant, a dye, an abrasive, and an odorant.

In some embodiments the aqueous floor coating composition comprises (A) 25 to 80 weight % water; (B) 20 to 60 weight % of said at least one supramolecular polymer; and (C) 0 to 20 weight % of said one or more additional ingredients, based on the total weight of the floor coating composition, and wherein the total of (A), (B), and (C) is 100 weight %.

In some embodiments of the aqueous floor coating composition, the one or more 4H monomers (1) of the supramolecular polymer (B) comprises a TMI-MIC monomer.

In some embodiments of the aqueous floor coating composition, the monomer having acid functional groups (2) of the supramolecular polymer (B) is selected from the group consisting of: (meth)acrylic acid, itaconic acid and crotonic acid.

In some embodiments of the aqueous floor coating composition, the one or more ethylenically unsaturated monomers (3) of the supramolecular polymer (B) is selected from the group consisting of: methyl acrylate, ethyl acrylate, butyl acrylate, methyl methacrylate, ethyl methacrylate, butyl methacrylate, styrene and methyl styrene.

DETAILED DESCRIPTION OF THE INVENTION

Definitions

All percentages stated herein are weight percentages (wt %), unless otherwise indicated.

Hereinafter, each recited range includes all combinations and sub-combinations of ranges, as well as specific numerals contained therein.

Furthermore, hereinafter, any lower limit of a range of numbers, or any preferred lower limit of the range, may be combined with any upper limit of the range, or any preferred upper limit of the range, to define a preferred aspect or embodiment of the range. Unless otherwise indicated, each range of numbers includes all numbers, both rational and irrational numbers, subsumed within that range (e.g., the range from about 1 to about 5 includes, for example, 1, 1.5, 2, 2.75, 3, 3.80, 4, and 5).

The word "optionally" means "with or without." For example, "optionally, an additive" means with or without an additive.

As used herein, "a," "an," and "the," are used following an open-ended term such as comprising to mean "at least one."

As used herein the term "(meth)acrylic" refers to acrylic or methacrylic, and "(meth)acrylate" refers to acrylate or methacrylate.

The term "(meth)acrylamide," as used herein, refers to acrylamide (AM) or methacrylamide (MAM).

As used herein, the term "acrylic monomers" includes acrylic acid (AA), methacrylic acid (MAA), esters of AA and MAA, itaconic acid (IA), crotonic acid (CA), acrylamide (AM), methacrylamide (MAM), and derivatives of AM and MAM, e.g., alkyl (meth)acrylamides. Esters of AA and MAA include, but are not limited to, alkyl, hydroxyalkyl, phosphoalkyl and sulfoalkyl esters, e.g., methyl methacrylate (MMA), ethyl methacrylate (EMA), butyl methacrylate (BMA), isobutyl methacrylate (iBMA), hydroxyethyl methacrylate (HEMA), hydroxyethyl acrylate (HEA), methyl acrylate (MA), ethyl acrylate (EA), butyl acrylate (BA), ethylhexyl acrylate (EHA) and phosphoalkyl methacrylate (PEM).

As used herein, the term "vinyl monomers" refers to monomers that contain a carbon-carbon double bond that is connected to a heteroatom such as nitrogen or oxygen. Examples of vinyl monomers include, but are not limited to, vinyl acetate, vinyl formamide, vinyl acetamide, vinyl pyrrolidone, vinyl caprolactam, and long chain vinyl alkanoates such as vinyl neodecanoate, and vinyl stearate. The term vinyl monomers, as used herein, also includes vinyl aromatic monomers, which have one ethylenically unsaturated group per molecule. Vinyl aromatic monomers include, without limitation, styrenes and vinylpyridines. Vinyl aromatic monomers particularly useful in the present invention include, without limitation: styrene, 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 4-t-butylstyrene, 2,4-dichlorostyrene, 2,6-dichlorostyrene, 1-vinylnapthalene, cyclohexyl methacrylate, benzyl methacrylate and benzyl acrylate.

The phrase "floor coating composition" of the present invention refers to a composition such as a floor polish composition or a floor sealer composition. All such compositions also sometimes referred to more generally as floor care compositions by persons. The phrase "floor polish composition" refers to a composition for forming a film that can be stripped from the floor by a stripping agent or the like. The phrase "floor sealer composition" essentially refers to a composition for forming a film that is difficult to strip from a floor, but can also be used to protect flooring, such as a floor polish composition.

As used herein, a material is "aqueous" if that material contains at least 25% water by weight, based on the total weight of that material.

As used herein, a "dispersion" contains, sometimes among other ingredients, discrete particles that are suspended in a continuous medium. When the continuous medium contains at least 50% water by weight, based on the weight of the continuous medium, the dispersion is said to be an "aqueous dispersion," and the continuous medium is said to be an "aqueous medium." When at least some of the suspended discrete particles in the dispersion contain one or more polymers, the dispersion is said herein to be a "polymer dispersion." Thus, an "aqueous polymer dispersion" contains some polymer-containing particles suspended in a continuous medium that is at least 50% water.

As will be recognized by persons of ordinary skill in the relevant art, supramolecular polymers synthesized according to the present invention, as described hereinbelow, are in the form of aqueous polymer dispersions containing the supramolecular polymers. Such supramolecular polymers are synthesized by polymerization of various monomers, as also described hereinbelow. The aggregate of all monomers used to synthesize a supramolecular polymer is known herein as the "monomer mix."

Floor polishes are used to produce a glossy finish on a floor as well as to prolong its useful life. The gloss provided by the polish is the result of components in the polish which leave a coating and that function to smooth and clean the surface. Floor polish compositions are typically aqueous suspensions or dispersions of one or more water insoluble emulsion polymers having acid functional moieties, along with one or more other useful floor polish ingredients such as alkali soluble resins, plasticizers, waxes, preservatives, defoaming agents, dispersing agents, coalescents, leveling agents, solvents, surfactants, dyes, abrasives, odorants and optical brighteners.

Generally, supramolecular polymers are organic compounds that obtain their polymeric properties, for example with respect to mechanical strength, thermal sensitivity, etc., through a combination of covalent bonds and secondary specific interactions, the latter preferably having high bond strength. As discussed hereinabove, the synthesis of monomers having hydrogen bonding moieties, and their incorporation into supramolecular polymers having the ability to form multiple hydrogen bonds, are known, although a great deal of research continues in that field. Supramolecular polymers may contain one or more moieties which produce the secondary interactions, and some of these may contain hydrogen bond forming moieties which form two or more hydrogen bond bridges between polymer chains. Supramolecular polymers of particular interest herein have secondary physical interactions based on quadruple hydrogen bonding interactions between polymer chains (supramolecular interactions).

The type of supramolecular polymers suitable for use in the aqueous coating compositions of the present invention are those having quadruple hydrogen bond forming moieties. In such supramolecular polymers, the monomers are at least in part bound to one another via one or more sets of four H-bridges which are formed by complementary hydrogen bond forming moieties present on pairs of monomers having such moieties. Such supramolecular polymers may be obtained, for example, by copolymerizing monomers containing complementary or self-complementary quadruple hydrogen bonding groups with one or more monomers of choice.

Hereinafter, units capable of forming at least four hydrogen bonds (i.e., H-bridges) in a row, whether complimentary or self-complimentary, are referred to as "4H units" or "4H monomers," these terms being interchangeable.

The Invention

The present invention provides aqueous floor coating compositions which are useful in formulating floor finishes with improved durability and removability, without a multivalent crosslinker agent, but instead relying on supramolecular interactions of the complementary quadruple hydrogen bonding groups in the polymer backbone of certain supramolecular polymers. More particularly, the aqueous floor coating composition of the present invention comprises: (A) water;
  (B) at least one supramolecular polymer comprising polymerized units derived from:
    (1) one or more 4H monomers which comprise a polymerizable moiety and a quadruple hydrogen bonding (4H) moiety;
    (2) at least one monomer having acid functional groups; and
    (3) one or more ethylenically unsaturated monomers.
  (C) optionally, one or more of the following additional ingredients: an alkali soluble resin, a leveling agent, a wax emulsion, a defoaming agent, a preservative, a solvent, a surfactant, a dye, an abrasive, and an odorant.

These aqueous floor coating compositions provide excellent durability as a result of the multiple secondary hydrogen bonding forces, as well as improved removability due to their responsiveness to pH, solvent polarity, temperature, and concentration.

The Supramolecular Polymer (B)

Supramolecular polymers suitable for use in the aqueous coating compositions of the present invention are synthesized by polymerizing one or more 4H-monomers (1) with one or more monomers having acid functional groups (2) and one or more ethylenically unsaturated monomers (3). Monomers (2) and (3) may be of the same family or from a different family of monomers than those from which the 4H monomers are derived.

(1) The 4H Monomers

As already mentioned, monomers having quadruple hydrogen bonding moieties, which are functional groups capable of forming 4 hydrogen bond bridges, are referred to herein as "4H monomers." It is from the 4H monomers that the supramolecular polymers derive their quadruple hydrogen bonding moieties (4H units or 4H structures) which form complimentary or self-complimentary quadruple hydrogen bonds in the polymer matrix. Typically, 4H monomers each have the following general structure:

(a)-(b)-(c)

wherein (a) is a polymerizable group, (b) is a linking moiety and (c) is a 4H moiety capable of forming at least four hydrogen bridges, preferably four hydrogen bridges.

For example, without limitation, the polymerizable group (a) may be derived from monomers having an ethylenically unsaturated group or an ion-polymerizable group. Preferably, polymerizable group (a) is derived from monomers having an ethylenically unsaturated group, which means derived from monomers having a carbon-carbon double bond.

In some embodiments of the present invention, the monomer having a polymerizable group (a) has at least one functional group such as hydroxy, carboxylic acid, carboxylic ester, acyl halide, isocyanate, thioisocyanate, primary amine, secondary amine or halogen groups. In some embodiments, for example, without limitation, the monomer having a polymerizable group (a) is derived from acrylates, methacrylates, acrylamides, methacrylamides, styrenes, benzenes, vinyl-pyridines, other vinyl monomers, lactones, other cyclic esters, lactams, cyclic ethers and cyclic siloxanes. According to a particular embodiment of the invention, the monomer having a polymerizable group (a) is derived from acrylates, methacrylates, styrenes, benzene, acrylamides, methacrylamides and vinyl esters.

Examples of monomers having a polymerizable group (a) that are particularly useful in carrying out the invention are, without limitation: 2-hydroxyethyl acrylate, 2-hydroxy-propyl acrylate, 2,3-dihydroxypropyl acrylate, poly(ethylene glycol) acrylate, N-hydroxymethyl acrylamide, 2-hydroxyethyl methacrylate, 2-hydroxy-propyl methacrylate, 2,3-dihydroxypropyl methacrylate, poly(ethylene glycol) methacrylate, N,N-dimethylaminoethylmethacrylate, N-hydroxymethyl methacrylamide, vinylacetate, 4-hydroxymethyl-styrene, 4-aminomethyl-styrene, hexahydro-7-oxo-1H-azepine-4-carboxylic acid and 2,3-epoxy-1-propanol.

The monomer having a polymerizable group (a) may be selected from the group of monomers having an ethylenically unsaturated group, in particular monomers having a carbon-carbon double bond, wherein the monomers having a polymerizable group (a) has at least one functional group, wherein the functional group is selected from the group consisting of: hydroxy, carboxylic acid, carboxylic ester, acyl halide, isocyanate, thioisocyanate, primary amine, secondary amine or halogen groups. More particularly, the monomer having a polymerizable group (a) is selected from the group consisting of: acrylates, methacrylates, acrylamides, methacrylamides, styrenes, vinyl-pyridines, other vinyl monomers, lactones, other cyclic esters, lactams, cyclic ethers and cyclic siloxanes having a functional group selected from hydroxy, carboxylic acid, carboxylic ester, isocyanate, thioisocyanate, primary amine, secondary amine or halogen groups. Preferably, the monomer having a polymerizable group (a) is selected from the group of acrylates, methacrylates, acrylamides, methacrylamides, and vinyl esters, in particular vinyl acetates, said acrylates, methacrylates and vinyl esters preferably having a functional group selected from hydroxy, carboxylic acid, carboxylic ester, acyl halide, isocyanate, thioisocyanate, primary amine, secondary amine or halogen groups.

In general, the 4H moiety capable of forming at least four hydrogen bridges (c) has the general form (1') or (2'):

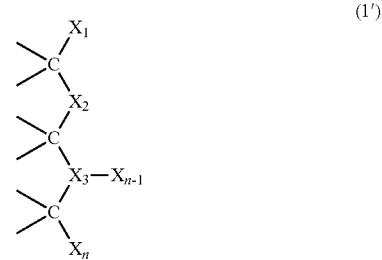

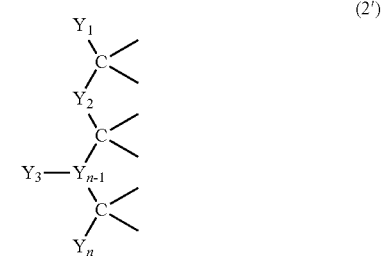

wherein C—$X_i$ and C—$Y_i$ linkages are each, separately, a single or double bond, n is 4 or more, and $X_1 \ldots X_n$ (=$X_i$)

and $Y_1 \ldots Y_n$ (═$Y_i$) represent donors or acceptors that form hydrogen bridges with the H-bridge-forming monomer containing a corresponding 4H moiety (2) linked to them, with $X_i$ representing a donor and Y, an acceptor or vice versa.

In embodiments where the 4H moiety (c) is capable of forming exactly four hydrogen bridges, n is 4 and the 4H moiety (c) has the general form (1) or (2):

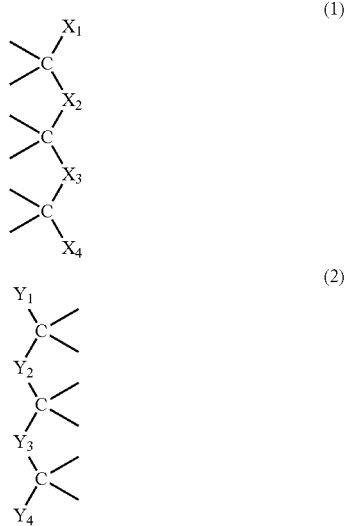

Properties of the 4H moiety (c) having general forms (1'), (2'), (1) or (2) are described in detail in U.S. Pat. No. 6,320,018, which for the US practice is incorporated herein by reference.

The 4H moieties (c) have at least four donors or acceptors, so that they will, in pairs, form at least four hydrogen bridges with one another. In some embodiments, the 4H moieties (c) have four donors or acceptors. In such embodiments, the 4H moieties are said to be "complimentary" with the $X_i$ atoms being donors and the $Y_i$ atoms being acceptors, or the other way around, so that pairs of the moieties (c)(1) and (c)(2) containing these atoms will form a quadruple hydrogen bond with one another.

In some embodiments of the present invention, the 4H moieties (c) have at least two successive donors, followed by at least two acceptors, preferably two successive donors followed by two successive acceptors, preferably moieties according to general form (1') or more preferably (1) with n=4, in which $X_1$ and $X_2$ both represent a donor or an acceptor, respectively, and $X_3$ and $X_4$ both an acceptor or a donor, respectively. The foregoing arrangement is commonly referred to as "self-complimentary" since each set of $X_i$ donor and acceptor atoms will be able to pair up with other sets of $X_i$-type donor and acceptor atoms and, therefore will not require the presence of a separate complimentary set of donors and acceptors, $Y_i$.

In some embodiments, the donor and acceptor atoms ($X_i$ and $Y_i$) are one or more atoms from O, S, and N.

Monomers from which suitable 4H moieties (c) may be derived are nitrogen containing compounds that are reacted with isocyanates or thioisocyanates, or that are activated and reacted with primary amines, to obtain a urea moiety that is part of the 4H moiety. The nitrogen containing compound is preferably an isocytosine derivative (i.e. a 2-amino-4-pyrimidone derivative) or a triazine derivative, or a tautomer of these derivatives. More preferably, the nitrogen containing compound is an isocytosine having an alkyl or oligoethylene glycol group in the 6-position, most preferably methyl, or ethylhexyl. The isocyanates or the thioisocyanates can be monofunctional isocyanates or monofunctional thioisocyanates or bifuntional diisocyanates or bifunctional thioisocyanates (for example alkyl or aryl (di)(thio)isocyanate(s)).

Particularly suitable compounds useful for providing 4H moiety (c) are the compounds shown below having general formulae (3) or (4), and tautomers thereof:

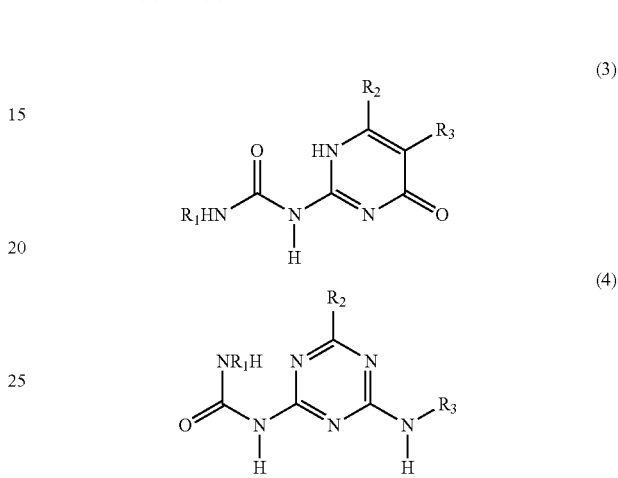

The 4H moiety (c) according to formulae (3) or (4), respectively, is bonded to the linking moiety (b) at $R_1$, $R_2$ or $R_3$ (so that $R_1$, $R_2$ or $R_3$ each, separately, represent a direct bond) with the other R groups representing a random side chain or are hydrogen atoms. More preferably, the 4H moiety (c) is bonded to the linking moiety (b) at $R_1$ (so that $R_1$ represents a direct bond) whereas $R_2$ and $R_3$ are a random side chain or are hydrogen atoms. Most preferably, $R_2$ is a random side chain and $R_3$ a hydrogen atom, wherein the random side chain is an alkyl or oligoethylene glycol group in the 6-position, most preferably methyl, or ethylhexyl.

The linking moiety (b) may be any one or more of shorter or longer chains, for example saturated or unsaturated, branched, cyclic or linear alkyl chains, siloxane chains, ester chains, ether chains and any chain of atoms used in traditional polymer chemistry, whether or not substituted with functional groups such as esters, ethers, ureas or urethanes. Preferably, the linking moiety (b) is a $C_1$-$C_{20}$ straight chain or branched alkylene, arylene, alkarylene or arylalkylene group, more preferably a $C_2$-$C_{10}$ straight chain or branched alkylene, arylene, alkarylene or arylalkylene group, wherein the alkylene, arylene, alkarylene or arylalkylene group may be substituted with other groups or may contain cyclic groups as substituent or in the main chain. Examples of such groups are, without limitation, methylene, ethylene, propylene, tetramethylene, pentamethylene, hexamethylene heptamethylene, octamethylene, nonamethylene, 1,6-bis(ethylene)cyclohexane, 1,6-bismethylene benzene, etc. The alkylene, arylene, alkarylene or arylalkylene groups may be interrupted by heteroatoms, in particular heteroatoms selected from the group of oxygen, nitrogen, and sulphur. The linking moiety (b), which links the monomeric unit having a polymerizable group (a) to 4H moiety (c), is derived from a compound having at least two functional groups, e.g., hydroxy, carboxylate, carboxylic ester, acyl halide, isocyanate, thioisocyanate, primary amine, secondary amine, or halogen functions. These functional groups are preferably present as end groups. According to the invention, such preferred compounds from which the linking moieties (b) are derived are preferably those having isocyanate or thioisocyanate end groups, more preferably isocyanate end groups. Examples of suitable isocyanates are diisocyanates or dithioisocyanates, in particular diisocyanates.

Without limitation, examples of diisocyanates suitable for use in the present invention are:

1,4-diisocyanato-4-methyl-pentane, 1,6-diisocyanato-2,2,4-trimethylhexane, 1,6-diisocyanato-2,4,4-trimethylhexane, 1,5-diisocyanato-5-methylhexane, 3(4)-isocyanatomethyl-1-methylcyclohexyl isocyanate, 1,6-diisocyanato-6-methyl-heptane, 1,5-diisocyanato-2,2,5-trimethylhexane, 1,7-diisocyanato-3,7-dimethyloctane, 1-isocyanato-1-methyl-4-(4-isocyanatobut-2-yl)-cyclohexane, 1-isocyanato-1,2,2-trimethyl-3-(2-isocyanato-ethyl)-cyclopentane, 1-isocyanato-1,4-dimethyl-4-isocyanatomethyl-cyclohexane, 1-isocyanato-1,3-dimethyl-3-isocyanatomethyl-cyclohexane, 1-isocyanatol-n-butyl-3-(4-isocyanatobut-1-yl)-cyclopentane.

1-isocyanato-1,2-dimethyl-3-ethyl-3-isocyanatomethyl-cyclopentane,

3(4)-isocyanatomethyl-1-methylcyclohexyl isocyanate (IMCI), toluene diisocyanate (TDI), methylene diphenyl diisocyanate (MDI), methylene dicyclohexane 4,4-diisocyanate, isophorone diisocyanate (IPDI), and hexane diisocyanate (HDI).

Examples of suitable thioisocyanates are the dithioisocyanate derivatives of the compounds listed above for suitable dithiocyanates.

In some embodiments, the diisocyanate is IPDI, HDI, MDI, TDI or methylene dicyclohexane 4,4-diisocyanate and their thioisocyanate counterparts.

In some embodiments, a single monomer compound may comprise both a linking moiety (b) and a polymerizable group (a) and may, therefore, be reacted directly with the monomer having a 4H moiety (c). For example, without limitation, in some embodiments of the present invention, isocyanate-functional monomers may be used, such as meta- and para-isopropenyl alpha,alpha-dimethylbenzyl isocyanates, or mixtures thereof. Meta-isopropenyl-alpha and alpha-dimethylbenzyl isocyanate are commercially available under the trade name TMI® (Meta) Unsaturated Aliphatic Isocyanate. TMI is an unsaturated aliphatic isocyanate monomer with a reactive tertiary aliphatic isocyanate (NCO) group, a methyl styrene group, and a polymerizable vinyl bond ($CH_3$—C=$CH_2$), which is commercially available, for example, from Cytec Industries, of Woodland Park, N.J., USA. It is represented by the formula:

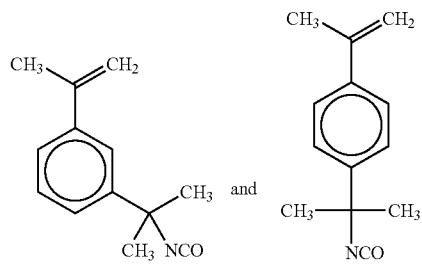

meta-     para-
Isopropenyl-alpha, alpha-dimethylbenzyl isocyanate (meta- and para-TMI)

Thus, in some embodiments of the present invention, the 4H monomer (1) of the supramolecular polymer (B) comprises a polymerizable group derived from TMI, and a 4H moiety derived from a derivative of 2-amino-4-pyrimidone, such as 2-amino-4-hydroxy-6-methylpyrimidine, also known as methylisosytosine or "MIC."

MIC has the formula (3) shown above, wherein $R_1$ and $R_3$ are hydrogen and $R_2$ is methyl.

The method for synthesizing the 4H-monomers is not particularly limited, with various chemistries available for selection by persons of ordinary skill in the relevant art. For example, without limitation, the 4H-monomers (1) may be prepared by one or more of the following methods.

According to a first method, the monomer having a polymerizable group (a) is reacted in a first step with the compound having at least two functional groups (from which the linking moiety (b) is derived). In a subsequent step, the product obtained in the first step is reacted with the nitrogen containing compound (from which the 4H moiety (c) is derived).

According to a second method, the nitrogen containing compound (from which the 4H moiety (c) is derived) is reacted in a first step with the compound having at least two functional groups (from which the linking moiety (b) is derived). In a subsequent step, the product obtained in the first step is reacted with the monomer having a polymerizable group (a).

According to a third method, the nitrogen containing compound (from which the 4H moiety (c) is derived) and is reacted directly with the monomer having a polymerizable group (a) wherein this monomer also has a ureido pyrimidone (UPY) group and is, therefore, able to form a urea linkage (b) between both reactants. Embodiments wherein the 4H monomers (1) of the supramolecular polymer (B) are derived from TMI (which has a polymerizable group (a) and a linking moiety (b)) and MIC (which has a 4H moiety (c)) are typically synthesized according to this third method, which conveniently eliminates one of the two reaction steps required by the above-described first and second methods for preparing the 4H monomers.

Where the 4H monomer is synthesized from TMI and MIC, it is referred to as a "TMI-MIC monomer."

Supramolecular polymers (B) suitable for use in the aqueous floor coating composition of the present invention may comprise, for example, 1 to 6 weight % (wt %) of polymerized residues derived from one or more 4H monomers (1). In some embodiments, for example, the supramolecular polymer (B) comprises at least 1 wt %, or at least 2 wt %, or at least 3 wt % of polymerized residues derived from one or more 4H monomers (1), based on the total weight of the supramolecular polymer (B). In some embodiments, for example, the supramolecular polymer (B) comprises up to 6 wt %, or up to 5 wt %, or up to 4 wt % of polymerized residues derived from one or more 4H monomers (1), based on the total weight of the supramolecular polymer (B).

In a particular embodiment of the present invention, the supramolecular polymer (B) comprises 2 to 4 wt % of polymerized residues derived from one or more 4H monomers (1), based on the total weight of the supramolecular polymer (B).

(2) Monomers Having Acid Functional Groups

Monomers having acid functional groups (2) suitable for use in synthesizing supramolecular polymers (B) useful in the aqueous floor coating composition according to the present invention, include for example, without limitation, (meth)acrylic acid, itaconic acid, crotonic acid, and mixtures thereof.

In some embodiments, the at least one monomer having acid functional groups is selected from the group consisting of: (meth)acrylic acid.

The supramolecular polymer (B) may comprise 5 to 20 wt % of polymerized residues derived from at least one monomer having acid functional groups (2), based on the total weight of the supramolecular polymer (B). In some embodiments, the supramolecular polymer (B) comprises at least 5 wt %, or at least 6 wt %, or at least 7 wt %, or at least 8 wt %, or at least 10 wt %, or at least 15 wt % of polymerized residues derived from at least one monomer having acid functional groups (2), based on the total weight of the supramolecular polymer (B). In some embodiments, for example, without limitation, the supramolecular polymer (B) comprises up to 20 wt %, or up to 18 wt %, or up to 15 wt %, or up to 14 wt %, or up to 13 wt %, or up to 12 wt % of polymerized residues derived from at least one monomer having acid functional groups (2), based on the total weight of the supramolecular polymer (B).

In a particular embodiment of the present invention, the supramolecular polymer (B) comprises 6-10 wt % of polymerized residues derived from monomer having acid functional groups (2), based on the total weight of the supramolecular polymer (B).

(3) Ethylenically Unsaturated Monomers

Ethylenically unsaturated monomers (3) suitable for use in synthesizing supramolecular polymers (B) useful in the aqueous floor coating composition according to the present invention, are those which can copolymerize with the polymerizable group (a) of the 4H monomer (1) to produce copolymers. Such ethylenically unsaturated monomers (3) are selected from the group consisting of: carboxylic acids, esters of carboxylic acids, maleic acids, styrenes, sulfonic acids, and combinations thereof.

Examples of suitable ethylenically unsaturated monomers (3) include, without limitation, acrylamides or methacrylamides wherein the amide group may be substituted with one or two $C_1$-$C_{30}$ branched or linear alkyl groups; other compounds having a vinyl group wherein said compounds are preferably selected from pyrrolidones, imidazoles, pyridines, caprolactams, piperidones, benzene and derivatives thereof; $C_4$-$C_{20}$ alkadienes; lactones; lactams; and saturated or unsaturated heterocyclic compounds containing one to five oxygen atoms.

For purposes of this invention, alkyl groups may be straight or branched chain alkyl groups or aralkyl or alkyl carbocyclic groups, such as alkylphenyl groups. In some embodiments of the invention, the alkyl groups are of synthetic origin and may contain a range of chain lengths. In some embodiments of the invention, alkyl groups are straight or branched chain acyclic alkyl groups. In some embodiments of the invention, the one or more ethylenically unsaturated monomer (3) comprises monomer residues of $C_1$-$C_8$ alkyl (meth)acrylate(s). In some embodiments of the invention, the $C_1$-$C_8$ alkyl (meth)acrylate(s) comprise an alkyl methacrylate and an alkyl acrylate, alternatively a $C_1$-$C_2$ alkyl methacrylate (MMA or EMA) and a $C_4$-$C_8$ alkyl acrylate (e.g., BA or EHA), alternatively MMA and a $C_4$-$C_8$ alkyl acrylate, alternatively MMA and BA.

Specific examples of suitable ethylenically unsaturated monomers (3) are, without limitation, methyl acrylate, butyl acrylate, 2-ethylhexyl acrylate, 2-hydroxyethyl acrylate, N,N-dimethylacrylamide, N-isopropylacrylamide, methacrylic acid, methyl methacrylate, ethyl methacrylate, butyl methacrylate, isobutyl methacrylate, 2-ethyl hexyl methacrylate, lauryl methacrylate, 2-hydroxy-ethyl methacrylate, vinylacetate, N-vinylpyrrolidinone, 2-vinylpyridine-1-oxide, N-vinyl imidazole, N-vinyl pyridine, N-vinylcaprolactam, N-vinyl-2-piperidone, acrylonitrile, styrene, butadiene, isoprene, caprolacton, butyrolacton, caprolactam, ethyleneoxide, propyleneoxide, tetrahydrofuran, 3,6-dimethyl-1,4-dioxane-2,5-dione, 1,4-dioxane-2,5-dione.

In some embodiments, the supramolecular polymer (B) comprises 74 to 94 wt % of polymerized residues derived from one or more ethylenically unsaturated monomers (3), based on the total weight of the supramolecular polymer (B).

In some embodiments, for example, without limitation, the supramolecular polymer (B) comprises at least 74 wt %, or at least 79 wt %, or at least 81 wt %, or at least 86 wt %, of polymerized residues derived from one or more ethylenically unsaturated monomers (3), based on the total weight of the supramolecular polymer (B). In some embodiments, for example, without limitation, the supramolecular polymer (B) comprises up to 94 wt %, or up to 93 wt %, or up to 92 wt %, of polymerized residues derived from one or more ethylenically unsaturated monomers (3), based on the total weight of the supramolecular polymer (B).

The polymerization reactions employed to synthesize the supramolecular polymers may be of any type (for example, bulk, dispersion, solution, emulsion, suspension or inverse phase emulsion), known now or in the future, and of any mechanism (for example, radical polymerization, condensation polymerization, transition metal catalyzed polymerization or ring opening polymerization), known now or in the future.

As stated hereinabove, "monomer mix" is contemplated herein to mean the aggregate of all monomers used to make the supramolecular polymers useful for the aqueous floor coating compositions of the present invention, regardless of the physical form in which the monomer mix is provided or used. For example, in some embodiments, the monomer mix may be provided as a single physical mixture in a single container wherein polymerization ultimately occurs. In some embodiments, the monomer mix may be provided as two or more blends, dispersion or solutions (which may be the same as each other or may be different from each other) of monomers in two or more different containers, which are then conveyed to a polymerization reaction zone where polymerization occurs. Furthermore, various blends, dispersion or solutions of one or more monomers which collectively provide all the monomers of the monomer mix required to synthesize the supramolecular polymer may be prepared separately and conveyed to a reaction zone in any order, as readily determinable by persons of ordinary skill in the relevant art, to perform the polymerization reaction.

The supramolecluar polymer may have a backbone of any type (linear, branched, star, hyperbranched, dendritic, comb-like or the like).

Furthermore, the structure of the supramolecular polymer may be of any structure, for example, without limitation, random, regular, tapered or block structures.

The number average molecular weight ($MW_n$) of the supramolecular polymers suitable for use in the aqueous coating compositions may be 500-50,000 daltons.

In some embodiments, the aqueous floor coating composition comprises a supramolecular polymer (B) comprising polymerized units derived from: (1) a TMI-MIC monomer; (2) at least one monomer having acid functional groups; and (3) one or more ethylenically unsaturated monomers.

When TMI-MIC monomer is incorporated into supramolecular polymers and those polymers are included in floor coating compositions in accordance with the present invention, quadruple supramolecular hydrogen (4H) bonds are formed among the 4H moieties, as shown schematically in Scheme I:

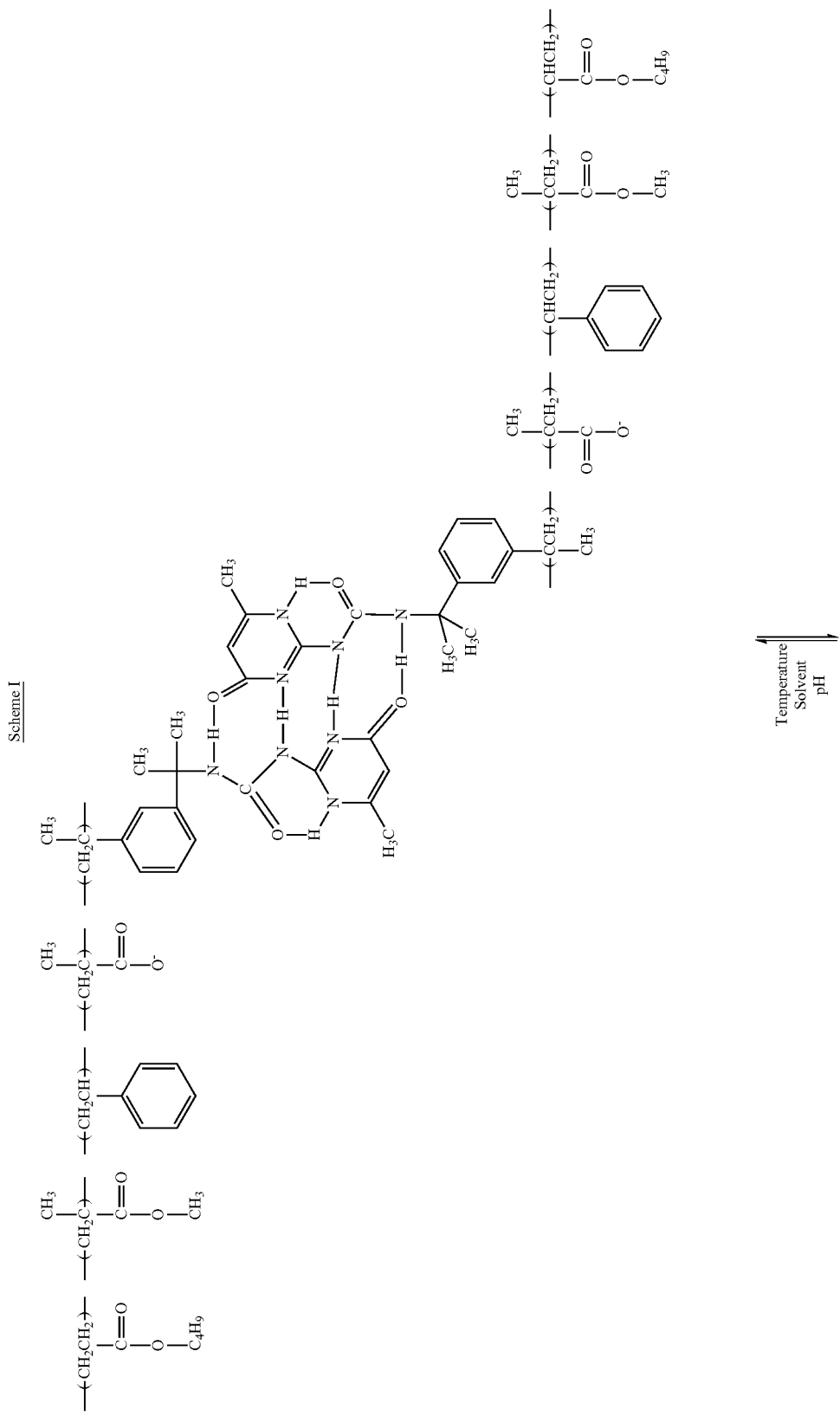

-continued
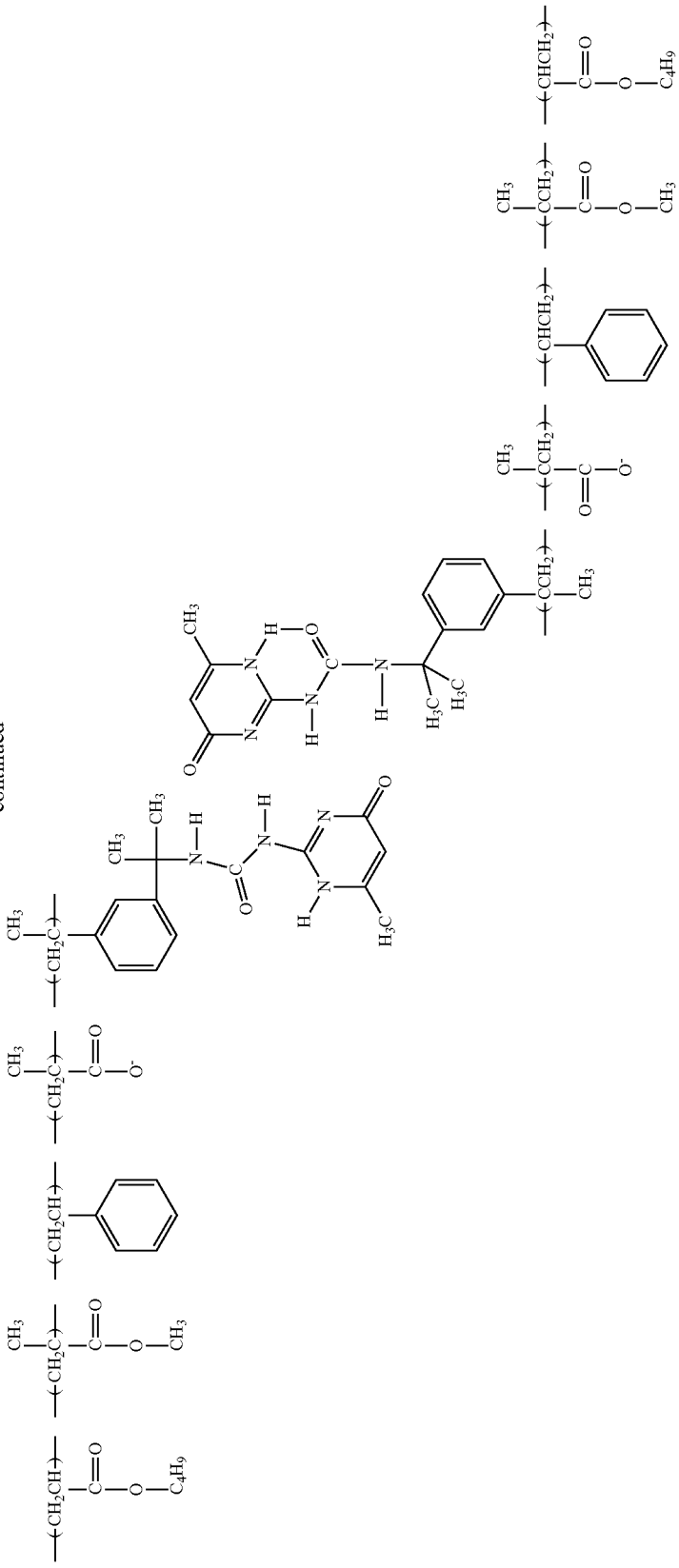

The introduction of quadruple hydrogen bonding functionality to latex emulsion polymers is advantageous because they provide supramolecular functionalities that enable the resulting polymer to exhibit desirable properties including thermoreversibility and responsiveness to external stimuli such as pH, solvent polarity, temperature, and concentration as illustrated in Scheme 1. The presence of these highly directional and stable multiple hydrogen bonding interactions in floor polish polymers will lead to improved mechanical performance and crosslinking in the absence of conventional metal crosslinking methodologies with associated heightened environmental concern.

In some particular embodiments, the aqueous floor coating composition comprises a supramolecular polymer (B) comprising polymerized units derived from: (1) one or more 4H monomers comprising a TMI-MIC monomer; (2) at least one monomer selected from the group consisting of (meth) acrylic acid; and (3) one or more ethylenically unsaturated monomers selected from the group consisting of: butyl acrylate, methyl methacrylate and styrene.

Aqueous Floor Coating Compositions

The floor coating composition of the present invention is typically an aqueous suspension or dispersion comprising: (A) water; (B) at least one supramolecular polymer and (C) optionally, one or more additional ingredients.

The floor coating composition of the present invention may comprise 25 to 80 weight % water (A), based on the total weight of the floor coating composition. In some embodiments, for example, without limitation, the floor coating composition of the present invention comprises at least 25 wt %, or at least 30 wt %, or at least 35 wt %, or at least 40 wt %, of water (A), based on the total weight of the floor coating composition. In some embodiments, for example, without limitation, the floor coating composition comprises up to 80 wt %, or up to 70 wt %, 60 wt %, or up to 50 wt %, of water (A), based on the total weight of the floor coating composition. The floor coating composition of the present invention may comprise 40 to 60 weight % of water (A), based on the total weight of the floor coating composition.

In some embodiments, the floor coating composition of the present invention comprises 10 to 60 wt % of the at least one supramolecular polymer (B), based on the total weight of the floor coating composition. In some embodiments, the floor coating composition of the present invention comprises at least 10 wt %, or at least 20 wt %, or at least 30 wt %, or at least 40 wt %, of the at least one supramolecular polymer (B), based on the total weight of the floor coating composition. In some embodiments, for example, without limitation, the floor coating composition comprises up to 60 wt %, or up to 55 wt %, 50 wt %, or up to 48 wt %, of the at least one supramolecular polymer (B), based on the total weight of the floor coating composition. In some embodiments, for example, without limitation, the floor coating composition comprises 40 to 50 wt % of the at least one supramolecular polymer (B), based on the total weight of the floor coating composition.

The incorporation of the polymerizable multiple hydrogen bonding monomer in the polymer is expected to improve the durability and scratch resistance of the floor care polymer by providing cross-linking characteristics similar to that expected from covalent crosslinking monomers in the polymer backbone. Herein, we describe the successful use of latex emulsions comprising supramolecular polymers with quadruple hydrogen bonding interactions for floor care applications in the absence of traditional metal crosslinking, covalent crosslinking or their combination.

In some embodiments, the floor coating composition of the present invention may contain one or more additional ingredients (C) typical of floor coatings such as, without limitation, an alkali soluble resin, a leveling agent, a wax emulsion, a defoaming agent, a preservative, a solvent, a surfactant, a dye, an abrasive, and an odorant.

A total amount of 0 to 20 wt % of such optional additional ingredients (C) may be present in the floor coating composition, based on the total weight of the floor coating composition. It is well within the ability of persons having ordinary skill in the relevant art to select compounds useful to include in the floor coating composition of the present invention, as well as the amounts of such additional ingredients.

Satisfactory floor polish formulations have been prepared without the inclusion of an alkali soluble resin (ASR). Therefore, an ASR is not required for a durable floor coating composition, such as floor polish. Nonetheless, depending on the properties inherent to the coating composition and its other ingredients, an ASR may optionally be employed to moderately reduce total formulation costs, improve leveling and gloss properties, and increase the coating sensitivity to alkaline strippers, depending upon the ultimate balance of properties desired by the coating formulator and qualities of the ASR.

Leveling agents are added to floor polish compositions to improve the appearance of the polish once it has been applied on a floor. Such agents are well known in the art and include, for example, fluorochemicals (see David A Butman & Myron T Pike, Chemical Times and Trends, The Journal of Chemical Specialties Manufacturers Association, January 1981, long chain alcohols (see U.S. Pat. No. 4,460,734), esters such as isobutyl isobutyrate, terpenol compounds such as pine oil, and organic phosphates such as tributoxy ethyl phosphate. Other compounds found to be useful leveling agents include nonanoic acid monoester of diethylene glycol and octylic acid monoester of diethylene glycol.

Solvents suitable for inclusion in aqueous floor coating compositions in accordance with the present invention are any solvents, known to persons of ordinary skill now or in the future. The one or more other solvents may, for example, be coalescing solvents, plasticizing solvents, or combinations thereof.

Suitable coalescing solvents, for example, may be selected from Butoxyethyl PROPASOL™, Butyl CARBITOL™, Butyl CELLOSOLVE™ Acetate, Butyl CELLOSOLVE™, Butyl DIPROPASOL™, Butyl PROPASOL™, CARBITOL™ PM-600, CARBITOL™ Low Gravity, CELLOSOLVE™ Acetate, CELLOSOLVE™, Ester EEP™, FILMER IBT™, Hexyl CARBITOL™, Hexyl CELLOSOLVE™, Methyl CARBITOL™, Methyl CELLOSOLVE™ Acetate, Methyl CELLOSOLVE™, Methyl DIPROPASOL™, Methyl PROPASOL™ Acetate, Methyl PROPASOL™, Propyl CARBITOL™, Propyl CELLOSOLVE™, Propyl DIPROPASOL™ and Propyl PROPASOL™, among others, all of which are available from Dow Chemical Company of Midland, Mich., U.S.A.

Suitable plasticizing solvents, for example, may be selected from ethylene glycol phenyl ether (commercially available as "DOWANOL™ EPh" from Dow Chemical Company), propylene glycol phenyl ether (commercially available as "DOWANOL™ PPh" from Dow Chemical Company); 2,2,4-Trimethyl-1,3-pentanediol diisobutyrate; tributoxy ethyl phosphate; dibasic esters such as dimethyl adipate, dimethyl succinate, dimethyl glutarate, dimethyl malonate, diethyl adipate, diethyl succinate, diethyl glutarate, dibutyl succinate, and dibutyl glutarate (including products commercially available under the trade designations DBE, DBE-3, DBE-4, DBE-5, DBE-6. DBE-9, DBE-IB, and DBE-ME from E.I. du Pont de Nemours and Company, of Wilmington, Del., U.S.A.); dialkyl carbonates such as dimethyl carbonate, diethyl carbonate, dipropyl carbonate, diisopropyl carbonate, and dibutyl carbonate; phthalate esters such as dibutyl phthalate, diethylhexyl phthalate, and diethyl phthalate, among others.

Conventional wetting agents, dispersing agents, defoamers, plasticizers and coalescing solvents may be used in conventional amounts, depending upon the balance of performance properties desired by the formulator. Other formulation ingredients, such as perfumes or odor-masking agents, dyes or colorants, bacteriocides and bacteriostats, may also be optionally included by the formulator.

EXAMPLES

Key to Abbreviated Terms used herein:
BA=Butyl acrylate
MMA=Methyl methacrylate
MAA=Methacrylic acid
STY=Styrene
DMSO=Dimethylsulfoxide
BHT=2,6-Di-tert-butyl-4-methyl phenol
TMI=3-isopropenyl dimethylbenzyl isocyanate
MIC=methyl isocytosine
TMI-MIC=4H bonding monomer

Synthesis of Polymerizable 4H Bonding Monomer, TMI-MIC

Scheme 2: Synthesis of polymerizable 4H bonding monomer, TMI—MIC

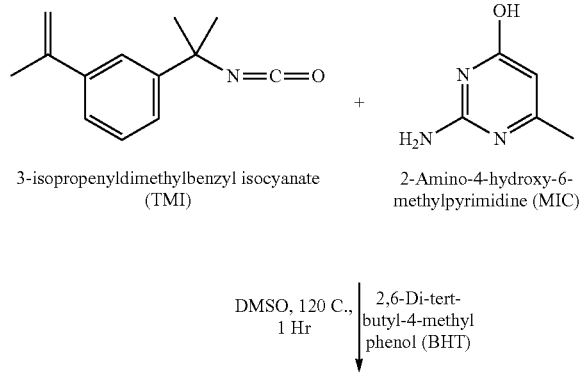

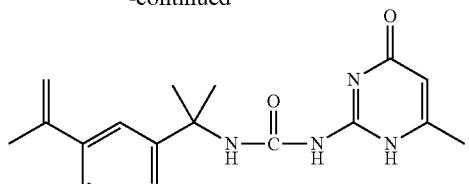

TMI—MIC Monomer

The synthesis of the polymerizable 4H monomer, TMI-MIC, was performed as follows.

In a suitable reaction vessel equipped with a thermometer, condenser, and stirrer, a suspension of methyl isocytosine (MIC) (38.5 g) and DMSO (207 g) was stirred and heated under nitrogen sweep at 150° C. to dissolve the MIC. Once the MIC was completely dissolved, the reaction mixture was cooled to 130° C. 3-isopropenyl-α-,α-dimethylbenzyl isocyanate (TMI) (61.8 g) and 2,6-di-tert-butyl-4-methyl phenol (0.1 g) was added to the reaction mixture and stirred for 60 minutes at 130° C. under nitrogen sweep. The reaction mixture was then cooled down to room temperature. The resulting white precipitate was vacuum filtered. The product, a white powder was washed several multiple times with methanol and dried in vacuo.

Synthesis of Supramolecular Polymers

Aqueous emulsion copolymerization of TMI-MIC with acrylate and methacrylate monomers typically used in floor care compositions was performed to synthesize supramolecular polymers useful in accordance with the present invention, as follows. Table 1 below lists the polymerization reaction recipe.

TABLE 1

| MATERIAL | EXAMPLE 1 | EXAMPLE 2 | COMPARATIVE 1 |
| --- | --- | --- | --- |
| REACTOR CHARGE | | | |
| D.I. WATER | 507.00 | 510 | 512 |
| SIPONATE DS-4 (23%) | 22.00 | 22.08 | 22.02 |
| FEED A | | | |
| D.I. WATER | 215.00 | 176 | 215 |
| DISPONIL FES 993 (30%) | 9.50 | 9.51 | 9.51 |
| BUTYL ACRYLATE | 310.00 | 310.00 | 310 |
| METHYL METHACRYLATE | 50.47 | 36.05 | 64.89 |
| STYRENE | 288.43 | 0.00 | 288.43 |
| GLACIAL METHACRYLIC ACID | 57.69 | 57.69 | 57.69 |
| TMI-MIC | 14.42 | 0.00 | 0.00 |
| D.I. WATER, rinse | 10.00 | 10.09 | 10.09 |
| FEED B | | | |
| D.I. WATER | 0.00 | 95.80 | 0.00 |
| STYRENE | 0.00 | 288.43 | 0.00 |
| DISPONIL FES 993 (30%) | 0.00 | 40.24 | 0.00 |
| TMI-MIC | 0.00 | 28.90 | 0.00 |
| FEED C | | | |
| MONOMER EMULSION SEED | 14.500 | 14.500 | 14.70 |
| D.I. WATER, rinse | 10.00 | 10.00 | 10.07 |
| FEED D | | | |
| AMMONIUM PERSULFATE | 3.16 | 3.16 | 3.15 |
| D.I. WATER | 14.03 | 14.22 | 14.10 |

TABLE 1-continued

| MATERIAL | EXAMPLE 1 | EXAMPLE 2 | COMPARATIVE 1 |
|---|---|---|---|
| FEED E | | | |
| AMMONIUM PERSULFATE | 0.61 | 0.62 | 0.61 |
| D.I. WATER | 101.52 | 100.80 | 100.33 |
| FEED F | | | |
| AMMONIUM BICARBONATE | 2.51 | 2.51 | 2.51 |
| D.I. WATER | 101.52 | 100.20 | 101.10 |
| FEED G | | | |
| t-BUTYLHYDROPEROXIDE (70%) | 1.25 | 1.24 | 1.24 |
| D.I. WATER | 12.17 | 12.53 | 12.10 |
| FEED H | | | |
| BRUGULLITE FF6 | 0.71 | 0.71 | 0.710 |
| D.I. WATER | 12.08 | 12.97 | 12.01 |
| FEED I | | | |
| t-BUTYLHYDROPEROXIDE (70%) | 1.25 | 1.25 | 1.24 |
| D.I. WATER | 12.00 | 12.83 | 12.33 |
| FEED J | | | |
| BRUGULLITE FF6 | 0.72 | 0.71 | 0.72 |
| D.I. WATER | 12.18 | 12.15 | 12.01 |
| FEED K | | | |
| AQUA AMMONIA (10%) | 89.15 | 30.56 | 51.43 |

Example 1

Supramolecular Polymer—43.0BA/7.0MMA/40STY/8.0MAA/2.0TMI-MIC

In a suitable reaction vessel equipped with a thermometer, condenser, and stirrer, the initial reactor charge was heated to 85-86° C. under a nitrogen blanket while Feeds A and Feeds C to K, described in Table 1, were being prepared. The monomer emulsion seed, Feed B was removed from Feed A. At 85° C., Feed C and rinse was added all at once to the reaction vessel and the temperature adjusted to 80-85° C. followed by the kettle charge of Feed D. Within 2 minutes, the onset of polymerization was signaled by a temperature rise of 3° to 5° C. and a change in the appearance (color and opacity) of the reaction mixture. When the exotherm ceased, the remaining monomer mixture, Feed A, and Feeds E and F were gradually added to the reaction vessel, over 125 minutes, at about 85° C. After the additions were complete, the reactor contents were held at 85° C. for five minutes. The reactor was then cooled to 60° C. and reaction contents were then chased by adding first a shot of Feed G, followed by a shot of Feed H. A second chase, fifteen minutes later, consisted of gradually feeding a second redox pair, Feeds I and J over 25 minutes. After the chase, the contents of the reactor were cooled to ambient temperature. Feed K was then added to the reactor to adjust the pH to 7.5 to 8.3. The contents of the reactor was then passed through 100 and 325 mesh screens and characterized for solids, pH, viscosity and particle size.

Example 2

Supramolecular Polymer—43.0 BA/5.0MMA/40STY/8.0MAA/4.0TMI-MIC

The acrylic dispersion of Example 2 was prepared in the same manner as Example 1, except that the wt % of TMI-MIC monomer added was 4%. The polymer was prepared using a monomer emulsion containing a ratio of monomer as listed in Table 1. When the amount of TMI-MIC was greater than 2%, a separate feed, Feed B consisting of the TMI-MIC as well as the ingredients listed in Table 1, was co-fed separately for 60 minutes during the addition of Feed A.

Comparative Example A

Polymer—43.0 BA/9.0MMA/40STY/8.0MAA (no 4H Monomer)

The acrylic dispersion of Comparative Example A was prepared in the same manner as Example 1 except that no TMI-MIC monomer was added. The polymer was prepared using a monomer emulsion containing a ratio of monomer as listed in Table 1.

Analytical Measurements to Characterize Sample Polymers 1,2 and A

Differential Scanning Calorimetry:

Differential Scanning calorimetry (DSC): Glass transition temperature ($T_g$) analysis were performed at a heating rate of 10° C./min using a TA Instruments DSC (Model Q1000) equipped with an autosampler and cooled using a refrigeration cooling apparatus. The $T_g$ was reported as the transitional midpoint during the second heat.

Test Methods to Measure Floor Polish Performance

The method for applying the coating compositions is described in Annual Book of ASTM Standards, Section 15, Volume 15.04, test procedure ASTM D 3153, except that 0.04 mL per square inch coating was applied to black vinyl composition tile (BVCT) substrates. A total of 6 coats were applied.

Gloss and Recoat Gloss:

The method for determining the gloss performance and recoat gloss performance of polish formulations is described in Annual Book of ASTM Standards, Section 15, Volume 15.04, test procedure ASTM D 1455. Gloss determined on black vinyl composition tile (BVCT).

Detergent Resistance:

The detergent resistance test was performed on black vinyl composition tile coated with six coats of the test finishes. The coatings were allowed to dry for one hour before running this test. A circle (approximately one inch in diameter) was drawn on the dry coatings with a wax pencil marker. A 1/20 dilution (using water) of GP Forward General Purpose Cleaner (Sealed Air Diversey Care, Sturtevant, Wis. 53177, USA) was deposited in the circle on each coating until filled. The detergent solution was allowed to stand for thirty minutes at ambient temperature. At the end of thirty (30) minutes, the detergent solution was removed by blotting the area with a dry tissue and the circle was evaluated for any damage to the coatings by estimating the percent damage to the area tested.

Water Resistance:

Water resistance was evaluated after the films were dry for 24 hours. The method for determining the water resistance is described in "Annual Book of ASTM Standards," Section 15, Volume 15.04, Test Procedure ASTM D 1793 (2000). An assessment of the percent of the coating damaged was made one hour after the water was removed and stated as % damage after revovery. Film damage was also assessed immediately after the water was removed from the coating and stated as film whitening before recovery. The rating used for assessing the film whitening before recovery was:

10—No stains no whiteness
9—Slight stain
7—Stain with whiteness
5—Heavy whiteness
3—Heavy whiteness and some film is removed
0—All of the coating is removed Test Methods used to determine polymer characteristics:

Particle sizes herein were those measured by dynamic light scattering on a Brookhaven BI-90 analyzer. Latex samples were diluted to the appropriate concentration with 1N KCl (aq).

The method for determining pH is described in Annual Book of ASTM Standards, Section 15, Volume 15.04, test procedure ASTM E-70.

The method for determining viscosity is described in Annual Book of ASTM Standards, Section 15, Volume 15.04, test procedure D 3716-99 (2008), Section 7.

The method for determining solids content is described in Annual Book of ASTM Standards, Section 15, Volume 15.04, test procedure ASTM D 3716-99 (2008), Section 5.

Polymer Characteristics

As described above, TMI-MIC monomer was successfully copolymerized in with BA, MMA, MAA and Sty to synthesize supramolecular polymers useful in floor polish dispersions having unique self-complementary hydrogen bonding characteristics. The TMI-MIC was incorporated in to the floor polish compositions at 2 and 4 wt % and compared with traditional emulsion polymer, Comparative Example A, which did not contained the TMI-MIC monomer. The characterizations of the various polymers are presented below in Table 2.

TABLE 2

|  | Example 1 | Example 2 | Comparative Example A |
|---|---|---|---|
| PS (nm) | 72 | 68 | 65 |
| pH | 7.6 | 7.7 | 8.2 |
| Viscosity (cps) | 40 | 37 | 41 |
| Solids (%) | 42 | 37 | 38 |
| Actual Tg | 42 | 46 | 34 |

Floor Coating Formulations and Performance

The formulation of the emulsion polymers of this report was done in the manner common and well understood to those in the art. The ingredients used, and their proportions and manner of addition are the same as is commonly practiced. The formulation ingredients and formulation details listed in Table 3-4 was used for coating compositions of the examples provided. The amount of water was adjusted to maintain a solids level of 20% and compensate for differences in the solids content of each polymer. The materials are listed in order of addition. All Examples below were done on formulated coating compositions. The performance results are presented in Table 5. All the polymers provided gloss performance in floor polish that is comparable to the zinc containing floor polish based on DURA-PLUS™ 3.

TABLE 3

Ingredients Used in the Coating Formulations

| Ingredient | Function | Supplier |
|---|---|---|
| Water | Diluent |  |
| KATHON ™ CG/ICP | Preservative | Dow Chemical, Midland, MI, U.S.A. |
| DC-73 | Defoamer | Dow Corning, Midland, MI, U.S.A. |
| Tributoxy Ethyl Phosphate (TBEP) | Leveling Agent | Rhodia, Bristol, PA. U.S.A. |
| SMA 17352 | Alkali Soluble Resin | Cray Valley, Exton, PA, U.S.A. |
| DURAPLUS ™ 3 | Zinc containing Polymer Emulsion | Dow Chemical, Midland, MI, U.S.A. |
| CHEMREZ 30 | Alkali Soluble Resin | ChemCor, Chester, NY, U.S.A. |
| A-C 325 G | Wax Emulsion | Honeywell, Morristown, NJ, U.S.A. |
| A-C 43 G | Wax Emulsion | Honeywell, Morristown, NJ, U.S.A. |

TABLE 4

Floor Polish Formulation

| R.M. Order of Addition | Comparative A Parts | Example 1 Parts | Example 2 Parts |
|---|---|---|---|
| Water | 45.67 | 49.58 | 43.98 |
| KATHON CG (1.5%) | 0.04 | 0.04 | 0.04 |
| CAPSTONE ™ FS-61 (1%) | 0.84 | 0.84 | 0.84 |
| CARBITOL ™ Solvent | 4.00 | 4.00 | 4.00 |
| KP-140 TBEP | 2.15 | 2.15 | 2.15 |
| Example 2 | 0.00 | 0.00 | 45.69 |
| Example 1 | 0.00 | 40.09 | 0.00 |
| Comparative A | 44.00 | 0.00 | 0.00 |
| CHEMREZ ™ 30 (30%) | 0.00 | 0.00 | 0.00 |
| AC 325 G (35%) | 2.24 | 2.24 | 2.24 |
| AC-43G (40%) | 1.06 | 1.06 | 1.06 |
| TOTALS: | 100.00 | 100.00 | 100.00 |

TABLE 5

Floor Polish Composition Performance

|  | Duraplus 3 Parts | Comparative A Parts | Example 1 Parts | Example 2 Parts |
| --- | --- | --- | --- | --- |
| 20 Degree gloss build on BVCT | | | | |
| 6th Coat | 56.4 | 51.6 | 47.3 | 50.8 |
| next day | 35.5 | 37.0 | 35.0 | 36.3 |
| 60 Degree gloss build on BVCT | | | | |
| 6th Coat | 87 | 85 | 82 | 84 |
| next day | 73 | 74 | 72 | 74 |
| Water Resistance (1 hour spot test, 1 hour after 6th coat) | | | | |
| % damage after recovery | 0% | 0% | 1% | 1% |
| observation of water film whitening bfr. recov. | negl whiten 8 | whitening 6 | whitening 6 | whitening 6 |
| Alkaline Detergent Resistance (30 minute spot test, 1 hour after 6th coat) | | | | |
| % damage after recovery | 0% | 0% | 1% | 1% |

What is claimed is:

1. An aqueous floor coating composition comprising:
(A) water;
(B) at least one supramolecular polymer comprising polymerized units derived from:
 (1) one or more 4H monomers which comprise a polymerizable group and a quadruple hydrogen bonding (4H) moiety;
 (2) at least one monomer having acid functional groups; and
 (3) one or more ethylenically unsaturated monomers; and
(C) optionally, one or more additional ingredients selected from: an alkali soluble resin, a leveling agent, a wax emulsion, a defoaming agent, a preservative, a solvent, a surfactant, a dye, an abrasive, and an odorant, wherein said one or more 4H monomers (1) of said at least one supramolecular polymer (B) comprise a TMI-MIC monomer.

2. An aqueous floor coating composition comprising:
(A) water;
(B) at least one supramolecular polymer comprising polymerized units derived from:
 (1) one or more 4H monomers which comprise a polymerizable group and a quadruple hydrogen bonding (4H) moiety;
 (2) at least one monomer having acid functional groups; and
 (3) one or more ethylenically unsaturated monomers; and
(C) optionally, one or more additional ingredients selected from: an alkali soluble resin, a leveling agent, a wax emulsion, a defoaming agent, a preservative, a solvent, a surfactant, a dye, an abrasive, and an odorant, wherein said at least one supramolecular polymer (B) comprises polymerizable units derived from:
 (1) a TMI-MIC monomer;
 (2) (meth)acrylic acid; and
 (3) butyl acrylate, methyl methacrylate and styrene.

* * * * *